(12) United States Patent
Roszczenko et al.

(10) Patent No.: US 8,789,400 B2
(45) Date of Patent: Jul. 29, 2014

(54) MODULAR SEAT BACK

(75) Inventors: Piotr Roszczenko, Canton, MI (US);
Stefan Funk, Leichlingen (DE);
Michael C. Nazione, Howell, MI (US);
Charles R. Baker, Northville, MI (US)

(73) Assignee: Johnson Controls Technology Company, Holland, MI (US)

( * ) Notice: Subject to any disclaimer, the term of this patent is extended or adjusted under 35 U.S.C. 154(b) by 1028 days.

(21) Appl. No.: 12/515,234

(22) PCT Filed: Nov. 16, 2007

(86) PCT No.: PCT/US2007/084988
§ 371 (c)(1),
(2), (4) Date: Dec. 21, 2009

(87) PCT Pub. No.: WO2008/061233
PCT Pub. Date: May 22, 2008

(65) Prior Publication Data
US 2010/0109415 A1    May 6, 2010

Related U.S. Application Data

(60) Provisional application No. 60/859,415, filed on Nov. 16, 2006.

(51) Int. Cl.
*B21B 15/00* (2006.01)
*B21D 31/00* (2006.01)
*A47C 7/02* (2006.01)

(52) U.S. Cl.
USPC .................. 72/177; 72/379.2; 297/452.18

(58) Field of Classification Search
USPC ...................... 297/452.18; 72/379.2, 176–182
See application file for complete search history.

(56) References Cited

U.S. PATENT DOCUMENTS

| 4,493,505 | A |   | 1/1985  | Yamawaki |       |
|-----------|---|---|---------|----------|-------|
| 5,547,259 | A |   | 8/1996  | Fredrick |       |
| 5,671,976 | A |   | 9/1997  | Fredrick |       |
| 5,676,423 | A |   | 10/1997 | Pedronno |       |
| 5,829,831 | A |   | 11/1998 | Sharman  |       |
| 5,845,382 | A | * | 12/1998 | Schultz et al. | 72/61 |

(Continued)

FOREIGN PATENT DOCUMENTS

| DE | 4402864 A1  | 8/1995 |
|----|-------------|--------|
| DE | 29711197 U1 | 8/1998 |

(Continued)

OTHER PUBLICATIONS

Patent Cooperation Treaty, International Search Report, PCT/US/2007/084988, Jun. 2, 2008.

(Continued)

*Primary Examiner* — Anthony D Barfield
(74) *Attorney, Agent, or Firm* — Butzel Long

(57) ABSTRACT

A vehicle seat back having a vehicle seat back frame and a method of producing the seat back frame can be used in multiple vehicles and includes a stamped first vertical frame member having a varying depth u-shaped and a roll formed second frame member having a constant depth u-shaped cross section and the first frame member is a common part used in multiple vehicles having a substantially constant height vehicle seat backs and the second frame member is cut to length used in multiple vehicles having different width vehicle seat backs.

9 Claims, 17 Drawing Sheets

(56) References Cited

U.S. PATENT DOCUMENTS

| | | | |
|---|---|---|---|
| 6,082,823 A | 7/2000 | Aumont et al. | |
| 6,802,124 B2 | 10/2004 | Kinzer | |
| 6,857,698 B2 | 2/2005 | Saberan et al. | |
| 6,886,889 B2 * | 5/2005 | Vits et al. | 297/452.18 |
| 7,537,283 B2 | 5/2009 | Niitsuma | |
| 7,673,944 B2 * | 3/2010 | Behrens | 297/452.18 X |
| 2005/0252588 A1 | 11/2005 | Machrowicz et al. | |
| 2006/0175887 A1 | 8/2006 | Behrens | |

FOREIGN PATENT DOCUMENTS

| | | |
|---|---|---|
| DE | 10230562 C1 | 9/2003 |
| DE | 10240042 A1 | 3/2004 |
| DE | 102004039366 A1 | 3/2006 |
| DE | 202006001868 U1 | 4/2006 |
| DE | 202005001773 U1 | 6/2006 |
| DE | 102005043084 A1 | 3/2007 |
| DE | 102006036935 A1 | 10/2007 |
| DE | 10148364 B4 | 11/2007 |
| DE | 102006041563 A1 | 3/2008 |
| EP | 1413475 A2 | 4/2004 |
| EP | 1289794 B1 | 8/2005 |
| EP | 1847417 A1 | 10/2007 |
| EP | 1023199 B1 | 4/2009 |
| JP | 2006213201 A | 8/2006 |
| WO | WO9919164 A1 | 4/1999 |
| WO | WO2007028743 A1 | 3/2007 |
| WO | WO2007028743 A3 | 5/2007 |

OTHER PUBLICATIONS

Patent Cooperation Treaty, International Search Report and Written Opinion of the International Searching Authority, PCT/US/2007/084988, May 28, 2009.

Patent Cooperation Treaty, International Search Report, PCT/US2007/084988, Jun. 2, 2008.

Patent Cooperation Treaty, International Search Report and Written Opinion of the International Searching Authority, PCT/US2007/084988, May 28, 2009.

* cited by examiner

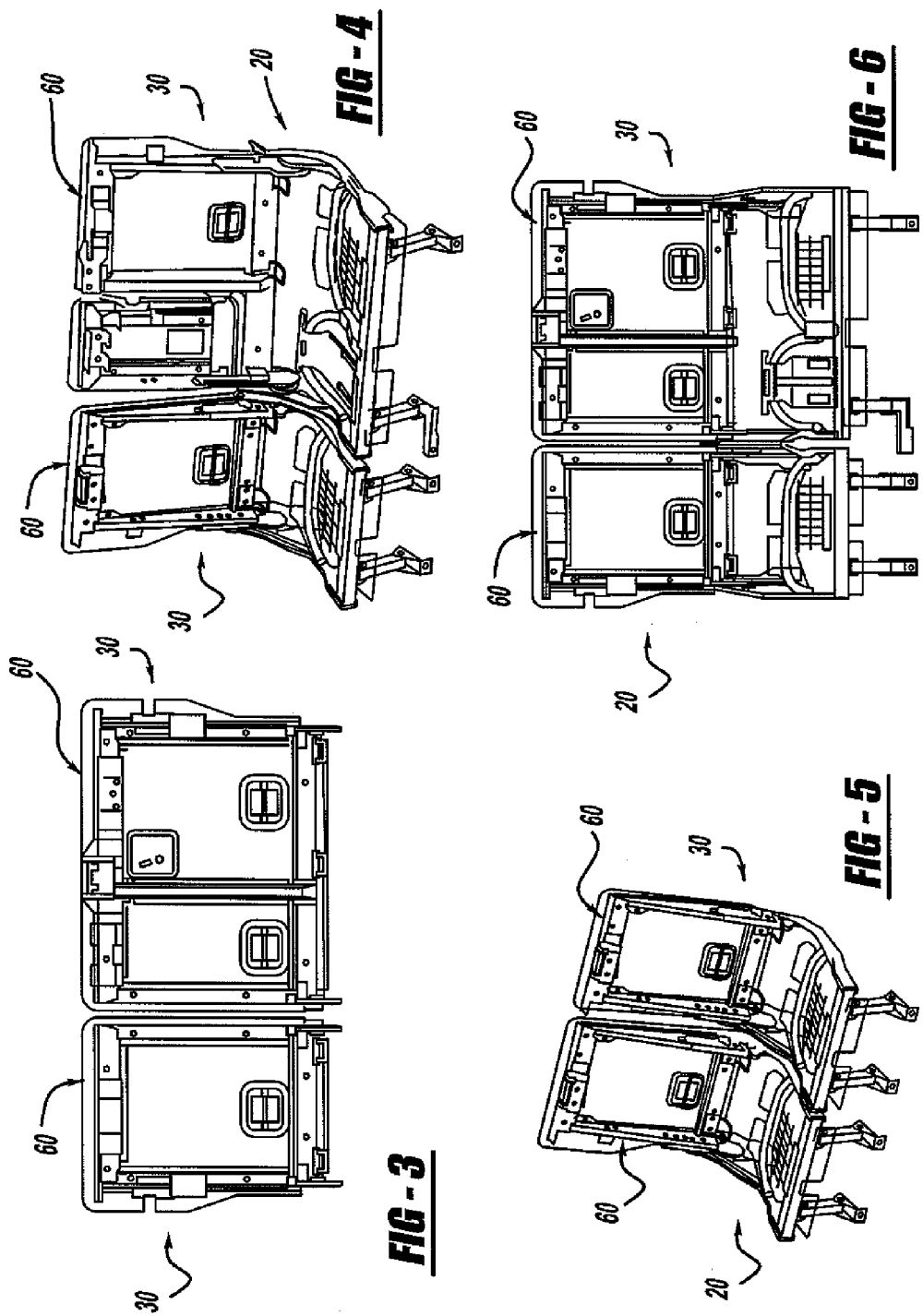

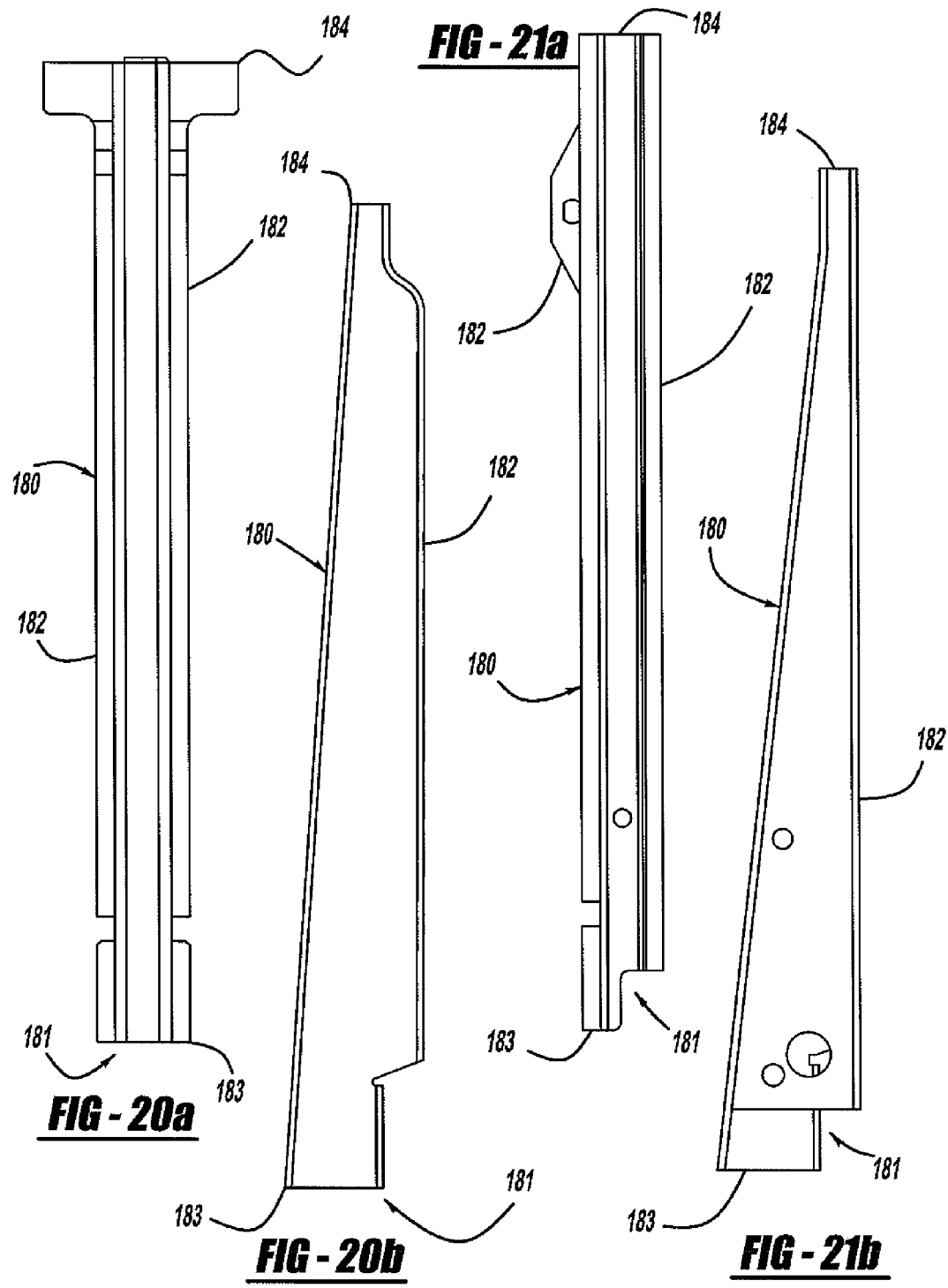

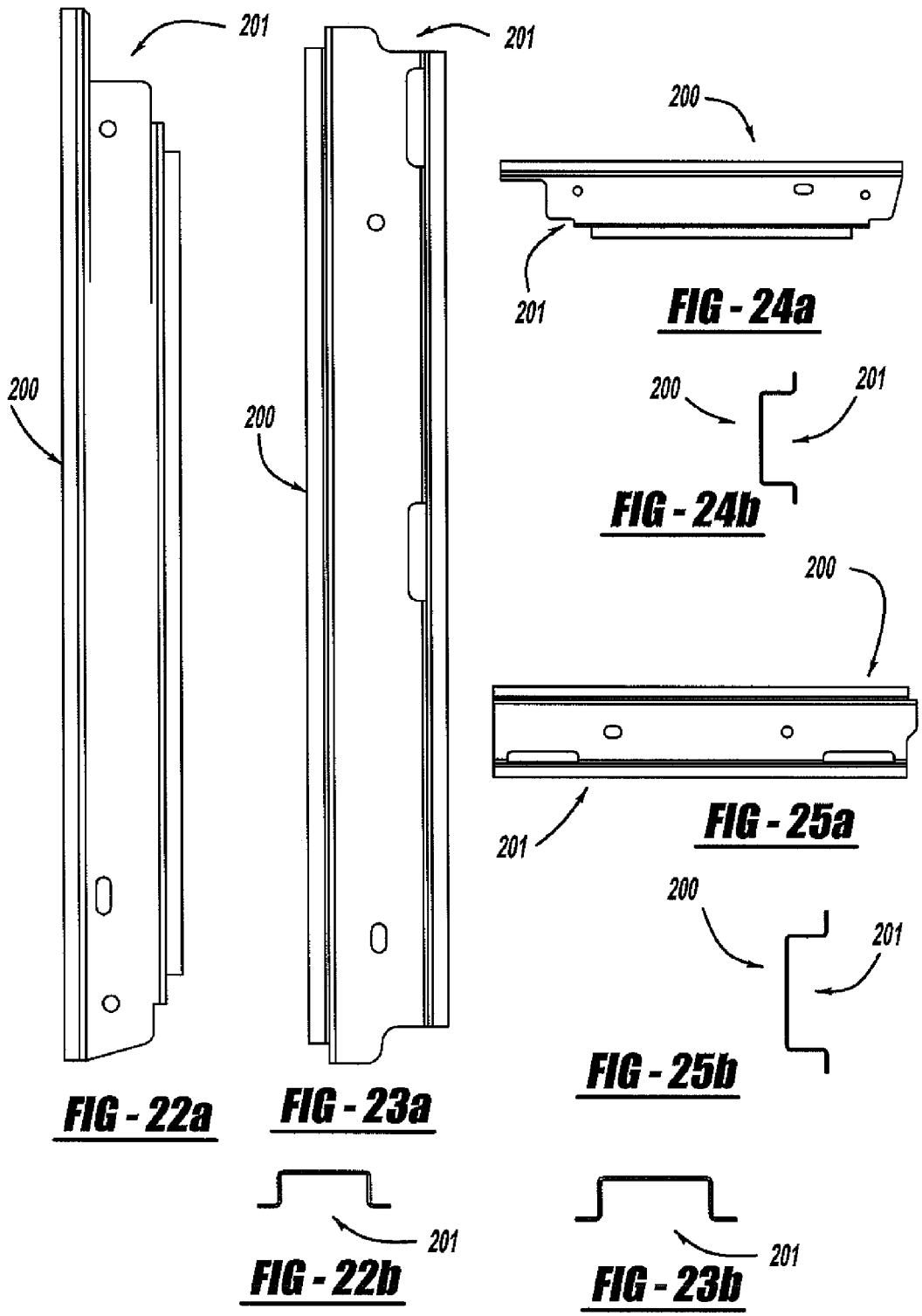

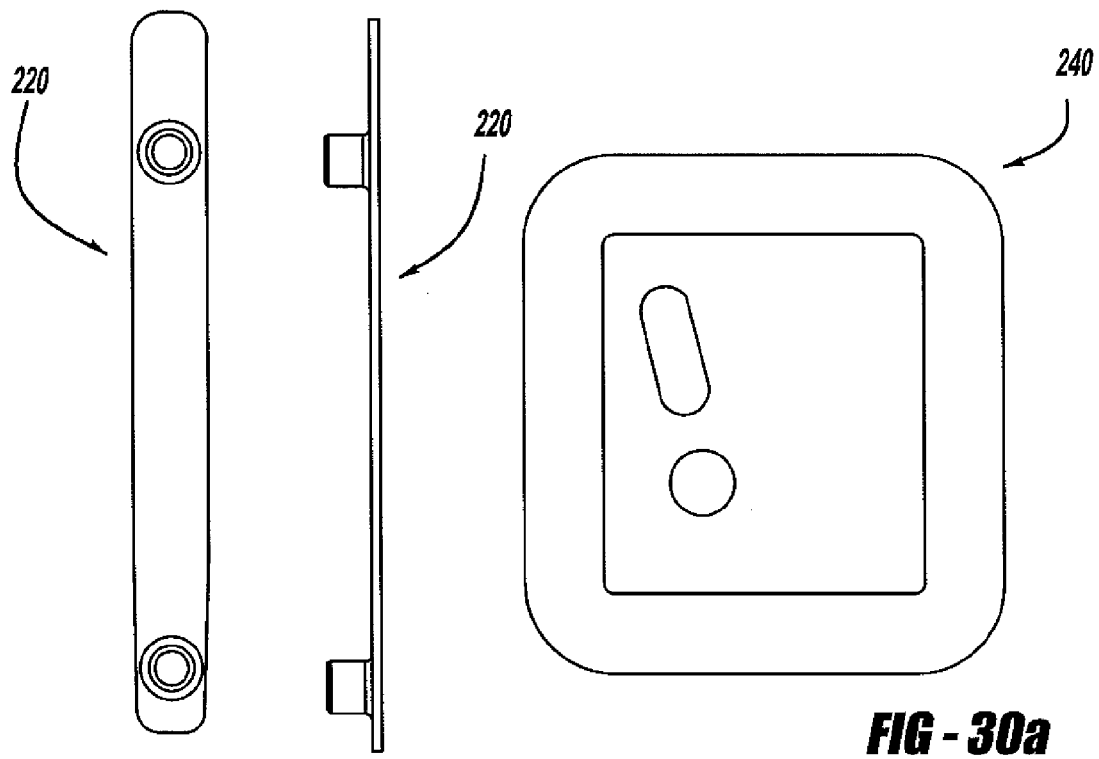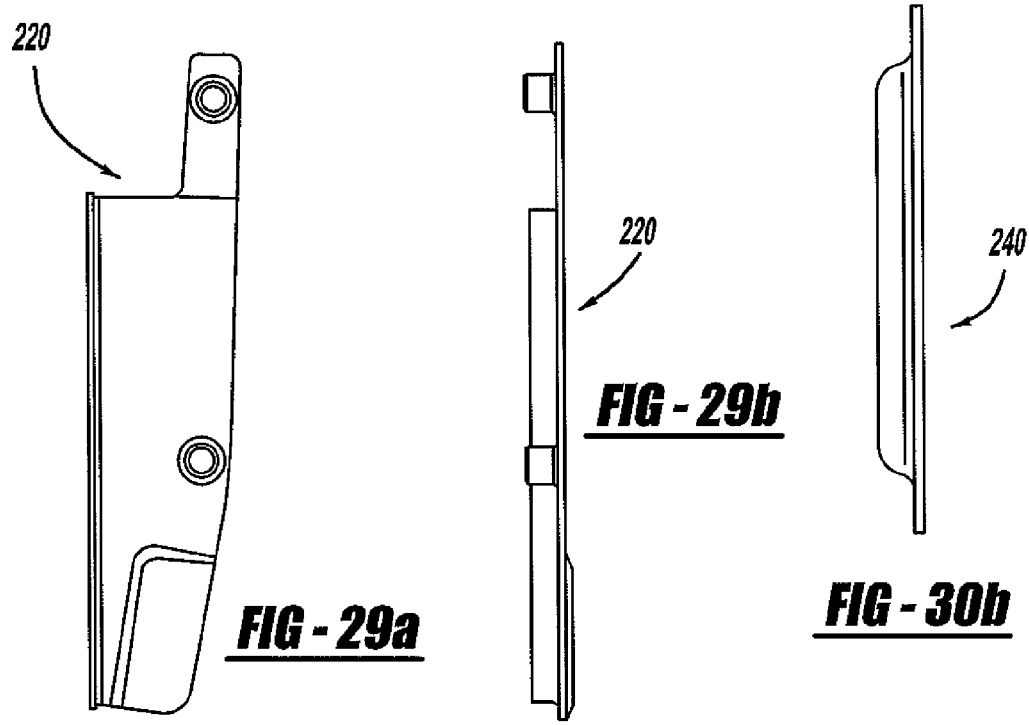

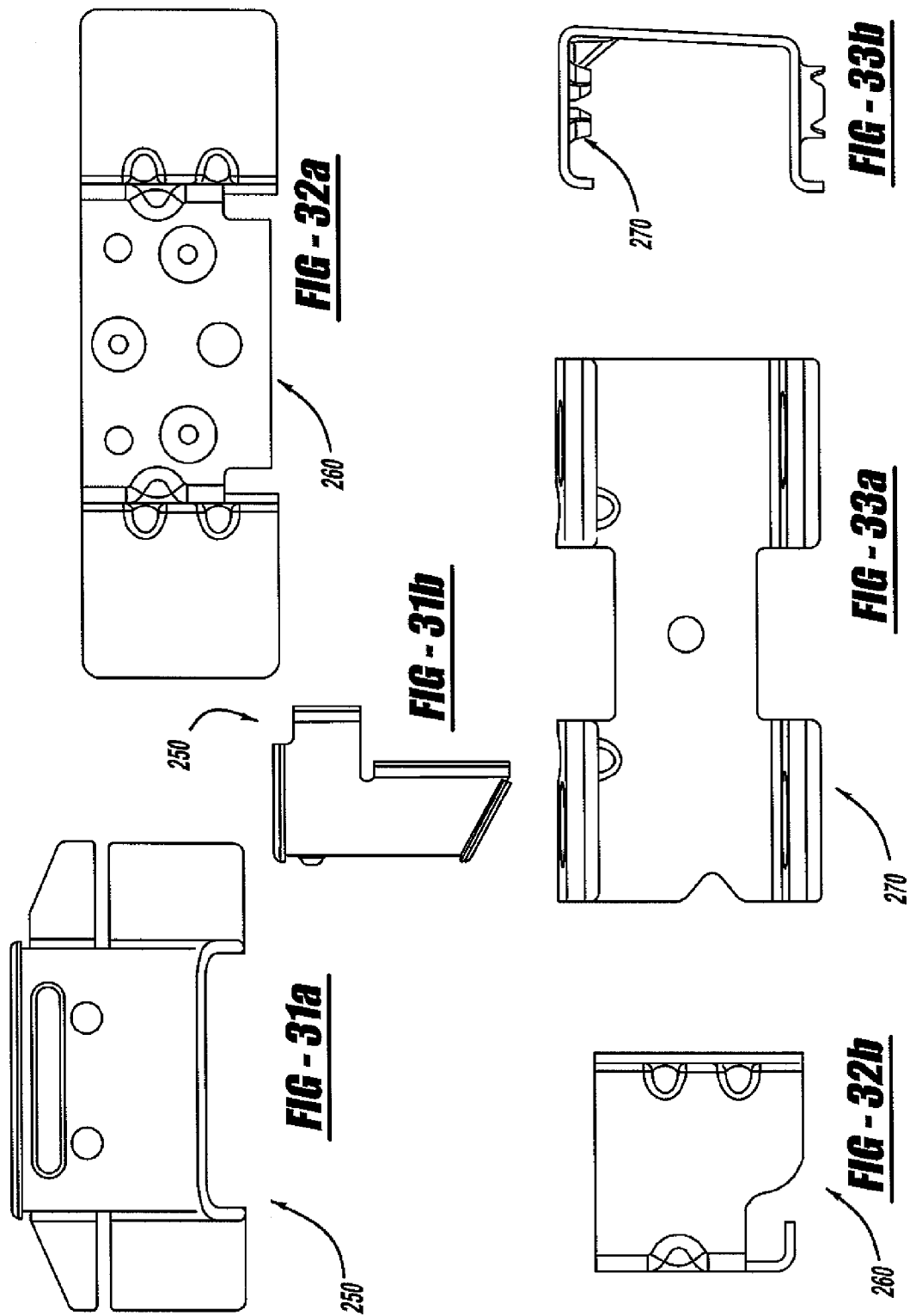

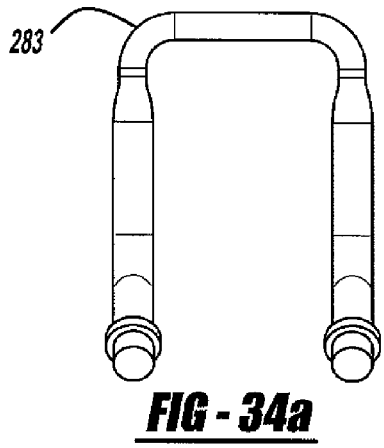
*FIG - 34b*
*FIG - 34a*
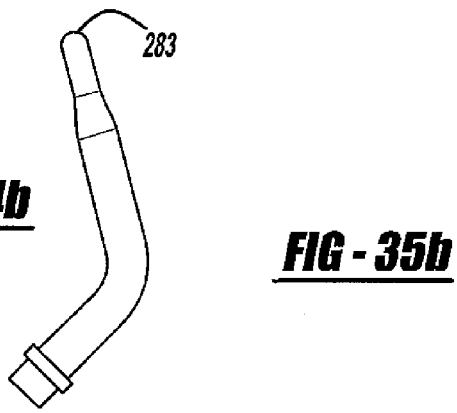
*FIG - 35b*
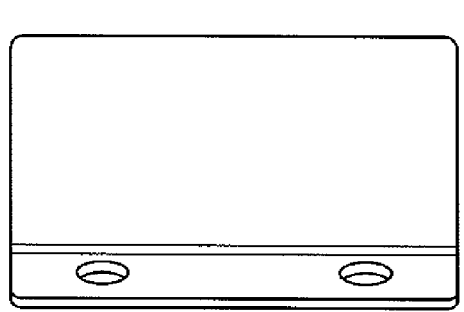
*FIG - 35a*
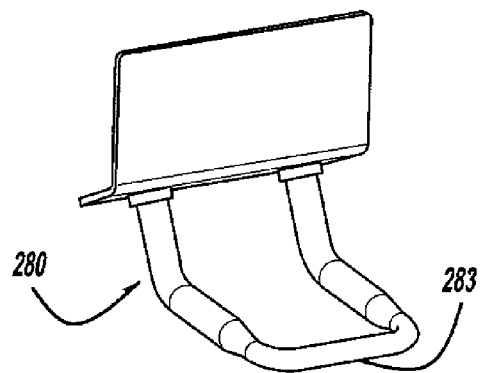
*FIG - 36*
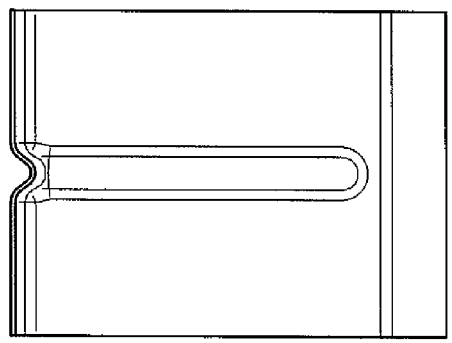
*FIG - 37a*
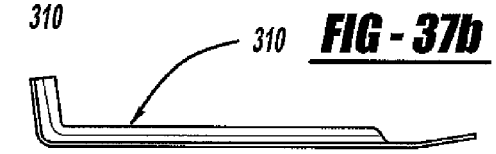
*FIG - 37b*
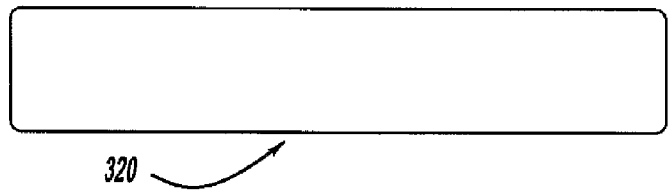
*FIG - 38*

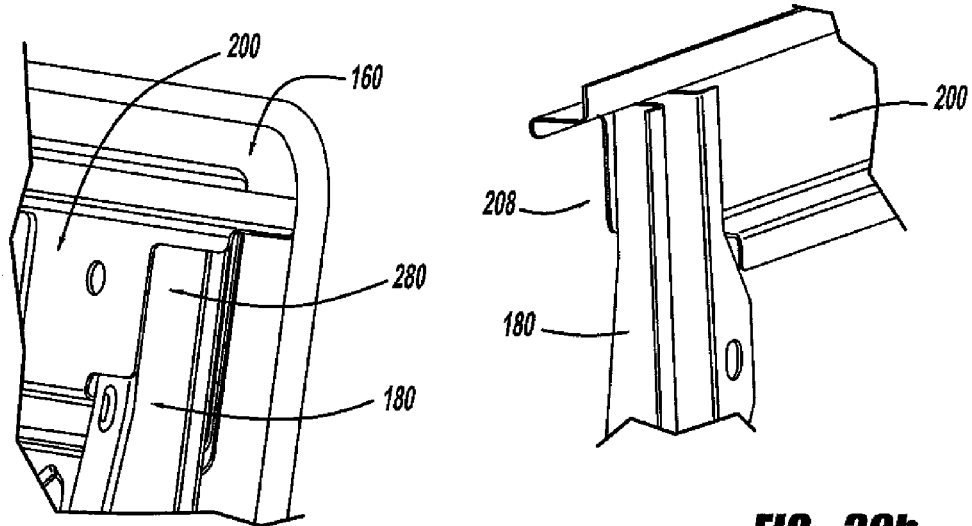
FIG - 39a
FIG - 39b
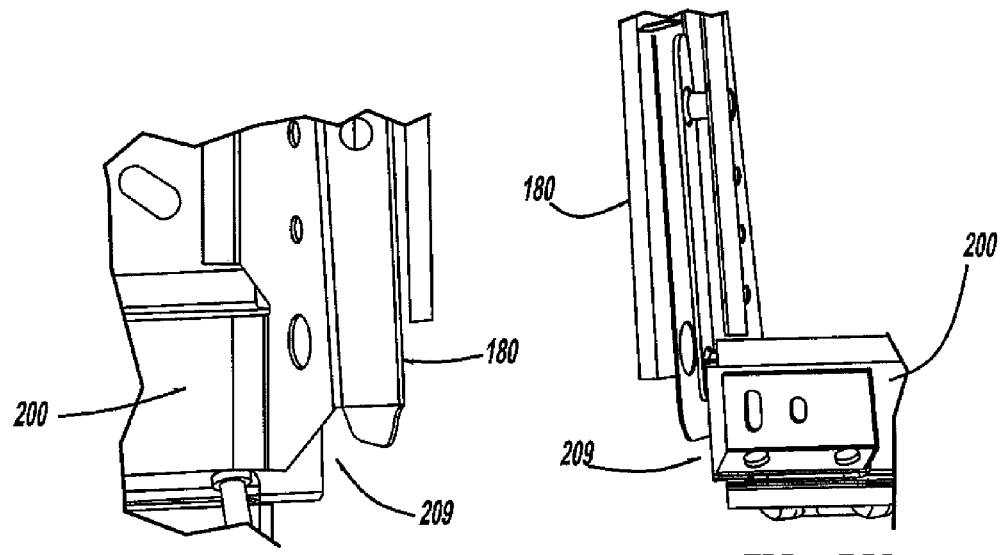
FIG - 40a
FIG - 40b

MODULAR SEAT BACK

CROSS-REFERENCE TO RELATED APPLICATIONS

The present application is National Stage filing of International Application No. PCT/US2007/084988, filed on Nov. 16, 2007, titled "Vehicle Seat Back Frame and Method" which claims priority to U.S. Provisional Application No. 60/859,415, filed Nov. 16, 2006, the entire disclosures of which are incorporated herein by reference.

BACKGROUND

The present disclosure relates generally to the field of vehicle seats and in particular to vehicle seat frames and their method of manufacture and construction.

SUMMARY

One exemplary embodiment of the present disclosure relates to a vehicle seat frame design and construction and to a method of manufacturing the vehicle seat frame wherein a first frame member has a generally u-shaped cross section and is aligned vertically and located proximate a first side of the vehicle seat back frame; a second frame member having a generally u-shaped cross section is aligned vertically and located proximate a second side of the vehicle seat; a third frame member having a generally constant depth u-shaped cross section and having a longitudinal extent is aligned horizontally and located proximate a third side of the vehicle seat; a fourth frame member having a generally constant depth u-shaped cross section is aligned horizontally and located proximate a fourth side of the vehicle seat back and wherein the first and second seat back frame members are manufactured using a stamping process for producing first and second seat back frame members having substantially the same longitudinal extent and the third and fourth seat back frame members are manufactured using a roll-forming process for producing first and second frame members of varying longitudinal extent.

Another exemplary embodiment of the present disclosure relates to a vehicle seat frame design of the above construction and method that is manufactured for use in the second row of a vehicle.

Another exemplary embodiment of the present disclosure relates to a vehicle seat frame design of the above construction and method that is manufactured for use in the third row of a vehicle.

One exemplary embodiment of the present disclosure relates to a vehicle seat frame design of the above construction and method that can be used to provide vehicle seat backs having generally constant height and varying widths in which the stamped vertical frame members are the same and the roll formed horizontal frame members are cut at varying lengths for use in multiple vehicle platforms.

Another exemplary embodiment of the present disclosure relates to a vehicle seat frame design of the above construction and method that can be used to provide vehicle seat backs having generally constant height and varying widths in which the stamped vertical frame members are the same and the roll formed horizontal frame members are cut at varying lengths for use in more than one type of vehicle platform.

BRIEF DESCRIPTION OF THE DRAWINGS

FIG. 3 is a front elevation view of a seat back frame according to exemplary embodiment with a 60/40 split and a high latch connection.

FIG. 4 is an isometric view of a vehicle seat frame according to another exemplary embodiment with a 40/20/40 split and a low latch connection.

FIG. 5 is an isometric view of a vehicle seat frame according to another exemplary embodiment with a 50/50 split and a low latch connection.

FIG. 6 is an isometric view of a vehicle seat frame according to another exemplary embodiment with a 60/40 split and a low latch connection.

FIGS. 20A and 20B are orthographic views of a vertical frame member for the seat back frame of FIG. 11.

FIGS. 21A and 21B are orthographic views of a vertical frame member for the seat back frame of FIG. 11.

FIGS. 22A and 22B are orthographic views of one horizontal frame member of the seat back frame in FIG. 11.

FIGS. 23A and 23B are orthographic views of one horizontal frame member of the seat back frame in FIG. 11.

FIGS. 24A and 24B are orthographic views of another horizontal frame member of the seat back frame in FIG. 11.

FIGS. 25A and 25B are orthographic views of another horizontal frame member of the seat back frame in FIG. 11.

FIGS. 28A and 282B are orthographic views of a coupling plate for the seat back frame in FIG. 11.

FIGS. 29A and 29B are orthographic views of a coupling plate for the seat back frame in FIG. 11.

FIGS. 30A and 30B are orthographic views of a retractor bracket for the seat back frame in FIG. 11.

FIGS. 31A and 31B are orthographic views of a belt bracket for the seat back frame in FIG. 11.

FIGS. 32A and 32B are orthographic views of a headrest bracket for the seat back frame in FIG. 11.

FIGS. 33A and 33B are orthographic views of a headrest bracket for the seat back frame in FIG. 11.

FIGS. 34A and 34B are orthographic views of an ISOFIX wire for the seat back frame in FIG. 11.

FIGS. 35A and 35B are orthographic views of an ISOFIX bracket for the seat back frame in FIG. 11.

FIG. 36 is an isometric view of an ISOFIX wire assembly for the seat back frame in FIG. 11.

FIGS. 37A and 37B are orthographic views of a reinforcement bracket for the seat back frame in FIG. 11.

FIG. 38 is a top plan view of a reinforcement plate for the frame in FIG. 11.

FIGS. 39A and 39B are partial isometric views of the joint between the vertical frame member and the horizontal frame member in FIG. 11.

FIGS. 40A and 40B are partial isometric views of the joint between the vertical frame member and the lower horizontal frame member in FIG. 11.

DETAILED DESCRIPTION

Figure 1:
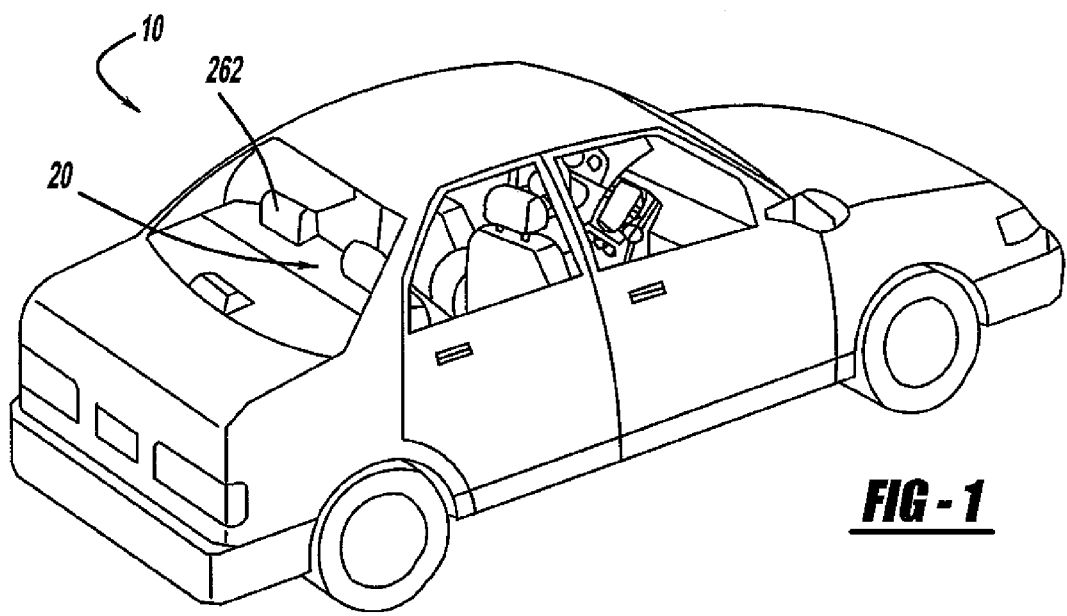
FIG. 1 is a schematic, isometric view of a vehicle with a vehicle seat having a seat frame according to an exemplary embodiment.

Referring generally to FIGS. 1 through 41 and particularly to FIG. 1, a vehicle 10 is shown with a vehicle seat 20 according to an exemplary embodiment. While the vehicle 10 is shown as a four-door sedan, it should be understood that the vehicle seat 20 may be used in any mini-van, sport utility vehicle or any other type of vehicle as well as in any other seat application. The vehicle seat 20 includes one or more seat back portion 30, and a base seat portion 40.

Figure 2:
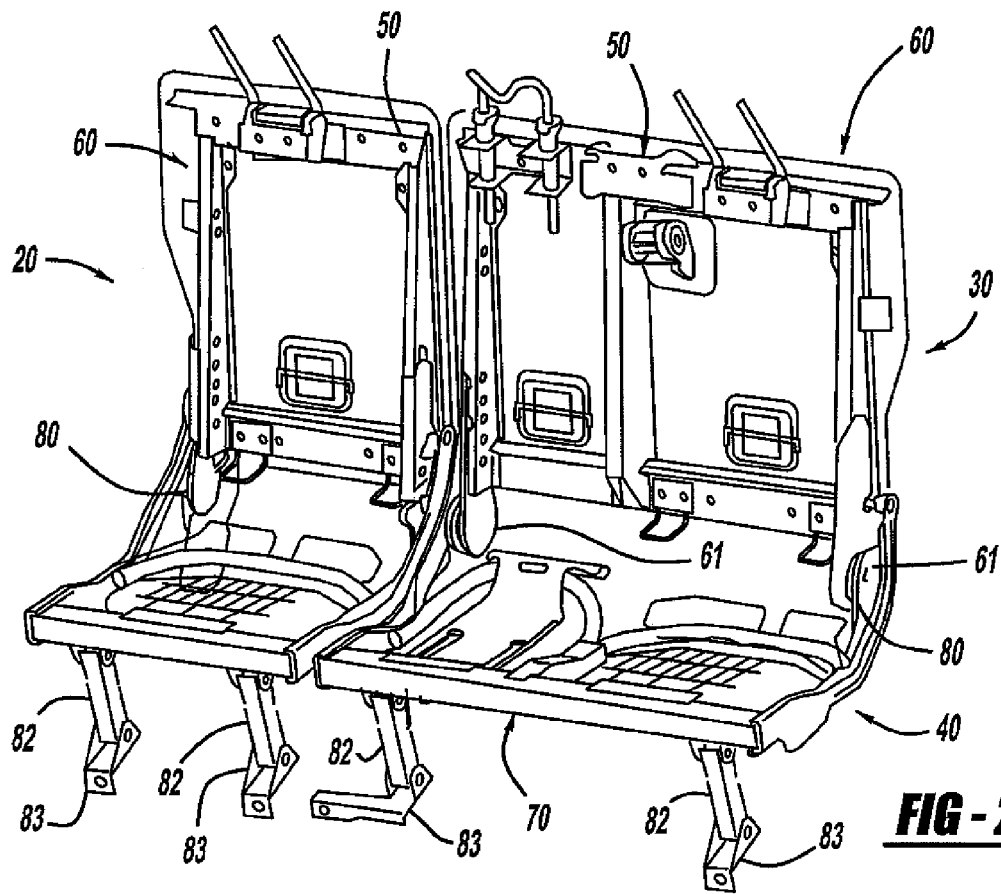
FIG. 2 is an isometric view of a seat frame for the vehicle seat according to an exemplary embodiment with a 60/40 split and a low connection.
Figure 7:
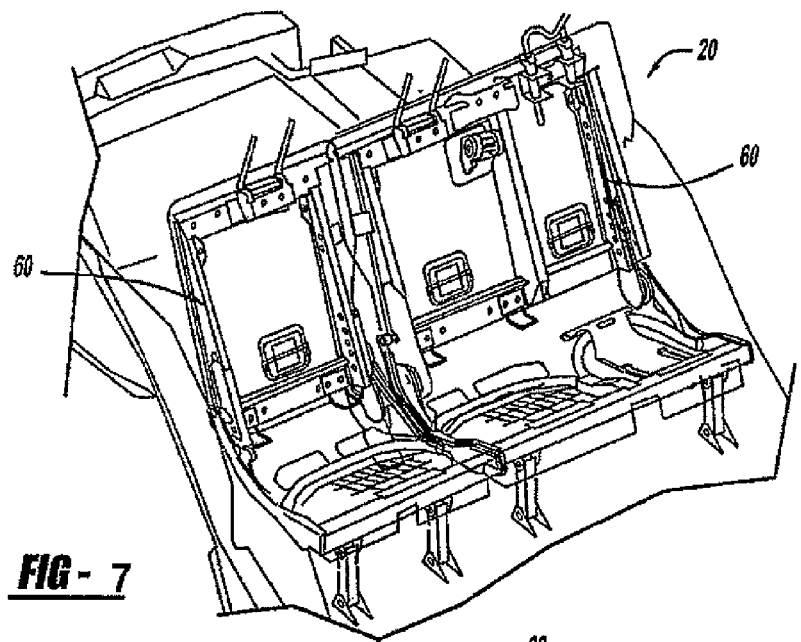
FIG. 7 is an isometric view of a 40/60 vehicle seat frame with a low latch connection according to an exemplary embodiment coupled to a vehicle at a second row position.
Figure 8:
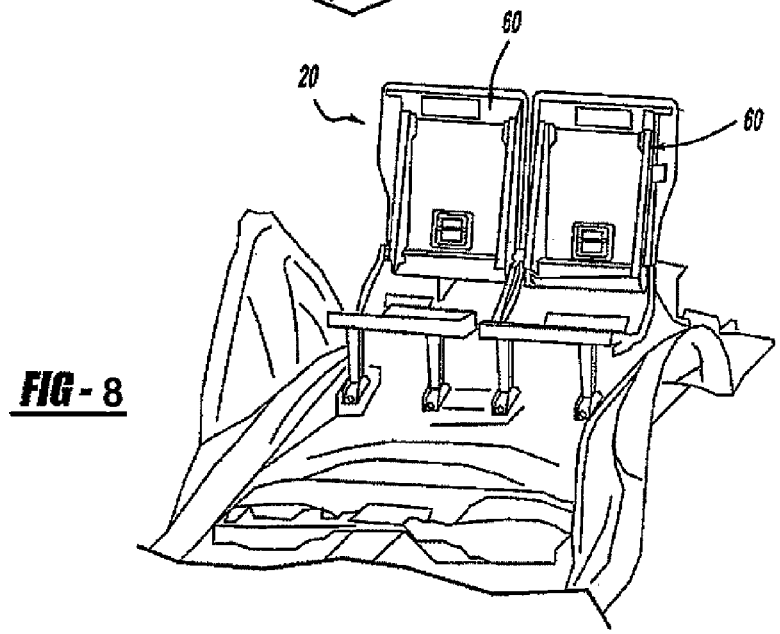
FIG. 8 is an isometric view of a 50/50 vehicle seat frame according to an exemplary embodiment coupled to a vehicle third row position.
Figure 12:
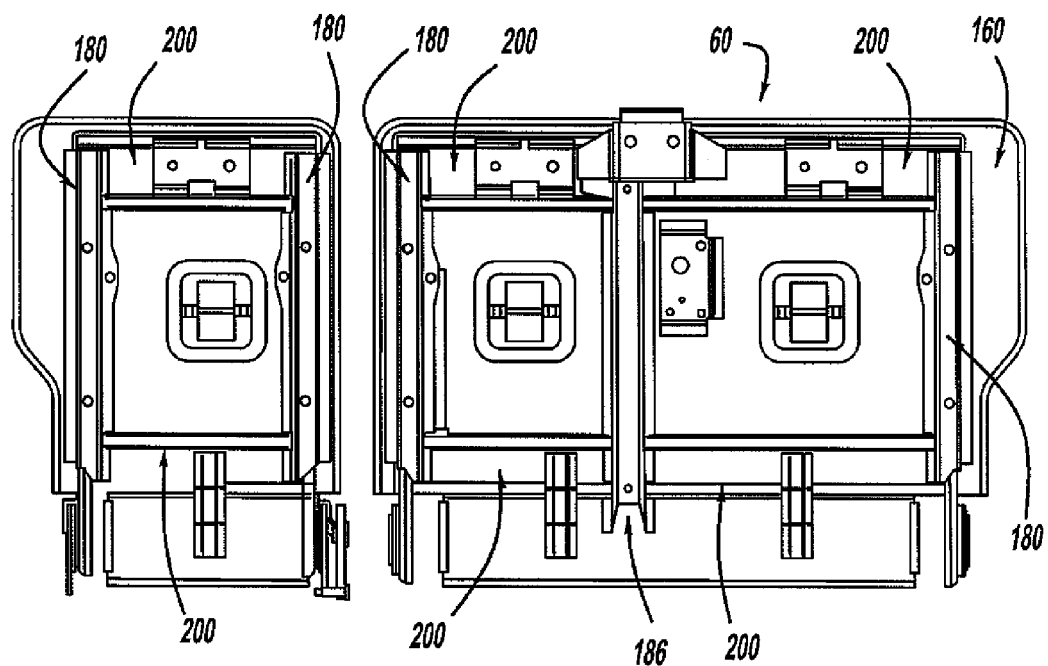
FIG. 12 is a front elevation view of the seat back frame of FIG. 2 with a low latch connection.

Referring in particular to FIGS. 2 and 12, a vehicle seat frame 50 for the seat 20 is shown that may be used in a vehicle 10, in particular a utility vehicle. The vehicle seat frame 50 includes one or more seat back frames 60; one or more seat base frames 70; optionally, one or more brackets 80 for connecting the seat back frames 60 to one of the seat base frame 70 to the vehicle 10; and a plurality of legs 82 that couple the seat frame to the vehicle.

The vehicle seat frame 50 and the seat back frame 60 is modular in construction and is designed to be adaptable to fit a variety of vehicle widths and configurations while retaining many common parts between different embodiments. According to one exemplary embodiment shown in FIG. 2, a bench-type vehicle seat 20 is split horizontally into two seat portions with an approximately 40/60 split and the seat back frames 60 are coupled to the vehicle 10 frame near a bottom 61 of the seat back frame 60. According to other exemplary embodiments, the bench-type vehicle seat 20 may be split other ways, including but not limited to a 50/50 split (as shown in FIG. 5) or a 40/20/40 split (as shown in FIG. 4). According to other exemplary embodiments, the vehicle seat 20 may be a captain's type seat 22, as shown in FIG. 1, or may be configured to latch to the vehicle 10 near the top 62 of the seat back frame 60, such as best shown in FIGS. 3 and 13 such as would be used in a second row of a sedan-type vehicle 10 where the vehicle seat back 30 folds down for reconfiguring the vehicle interior.

Figure 9:
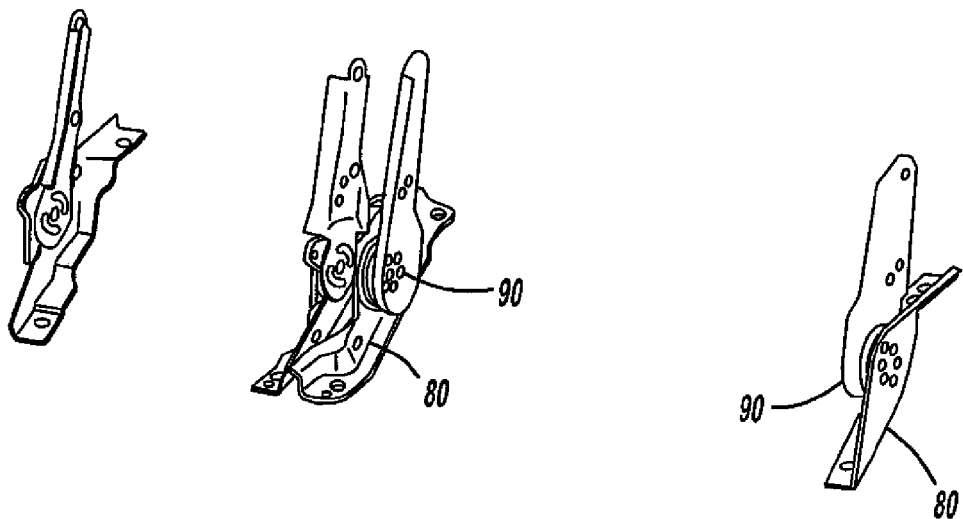
FIG. 9 is an isometric view of the bracket for connecting the seat back frame in FIG. 2 to the vehicle.
Figure 10:
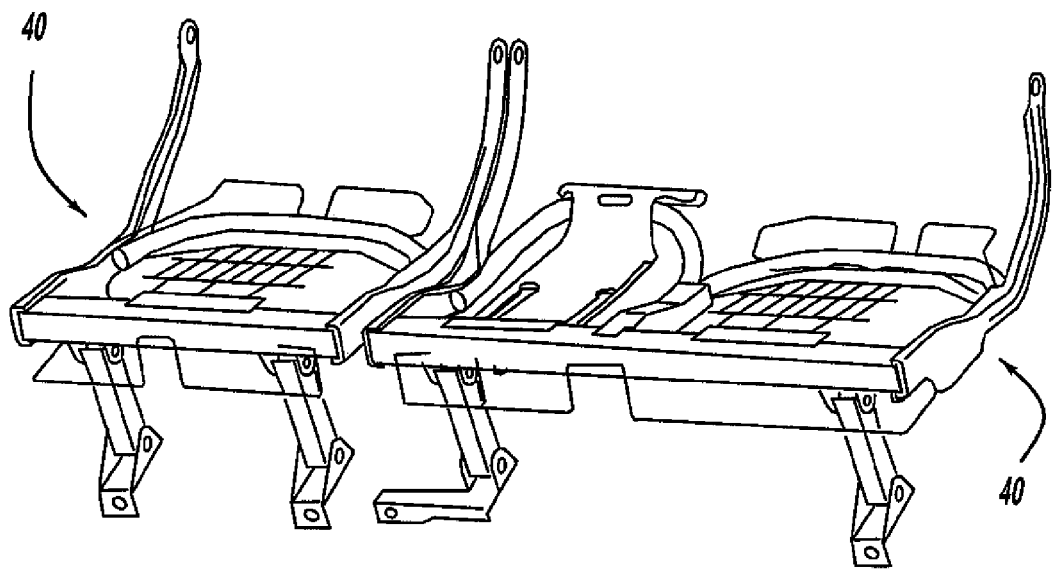
FIG. 10 is an isometric view of the seat back frame of FIG. 2.

Referring now in particular to FIG. 2, the vehicle seat frame 50 is shown according to one exemplary embodiment. The seat frame 50 includes the seat base frame 70 configured to support an occupant and includes resilient support structures such as a foam cushion (not shown) and a trim cover (not shown). The seat 20 includes legs 82 that extend downward from the seat base frame 70 and brackets 83 that are configured to couple the legs 82 to the vehicle 10. The seat base frame 70 is coupled to the seat back frame 60 including a recliner mechanism 90, as best shown in FIGS. 2, 5 and 9 that allow a passenger to selectively, angularly position the seat back portion 30 relative to the seat base portion 40. While a manual round, discontinuous recliner mechanism 90 is shown, any appropriate recliner device (manual or power) may be used.

Figure 11:
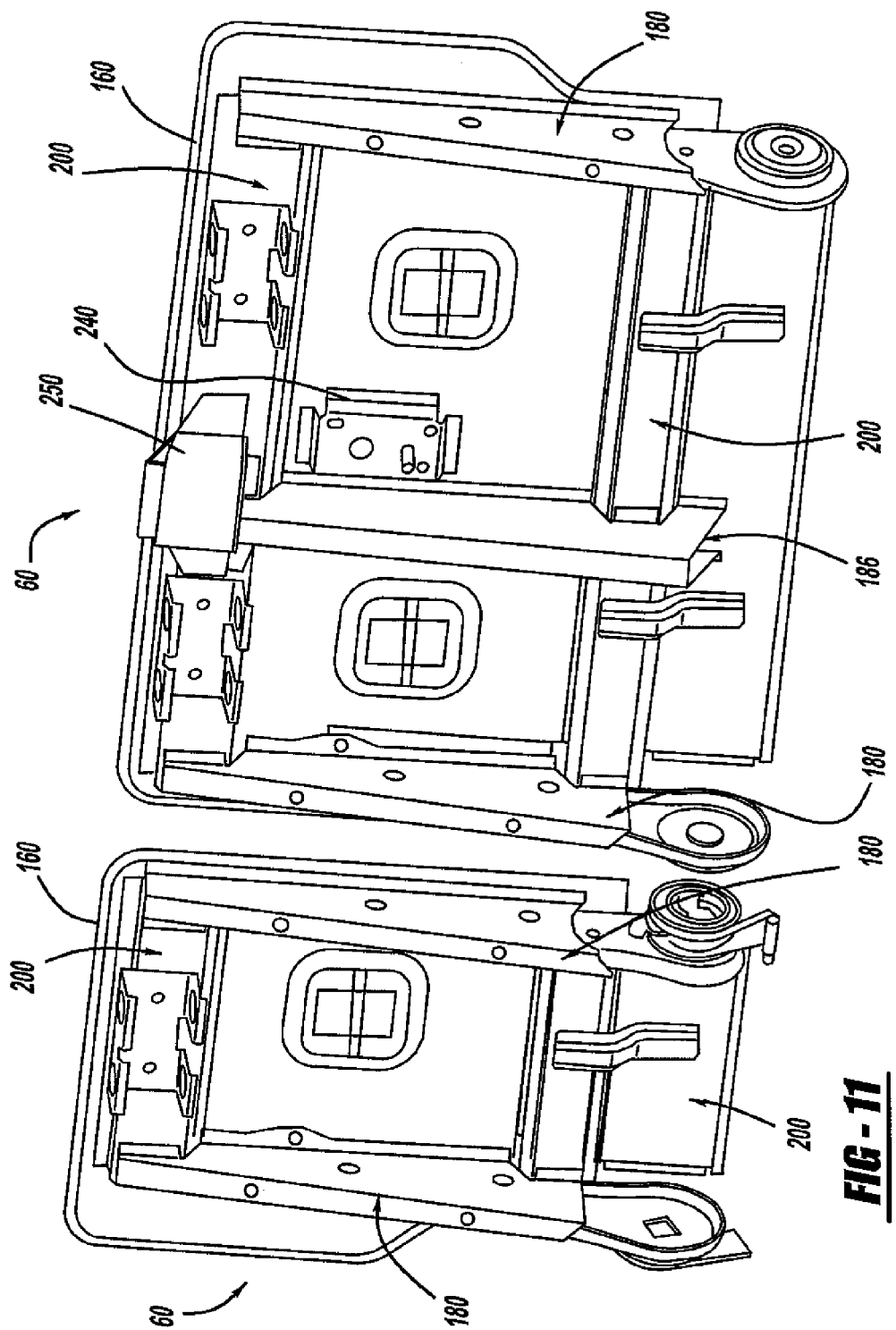
FIG. 11 is a perspective view of the seat back frame of FIG. 2.
Figure 13:
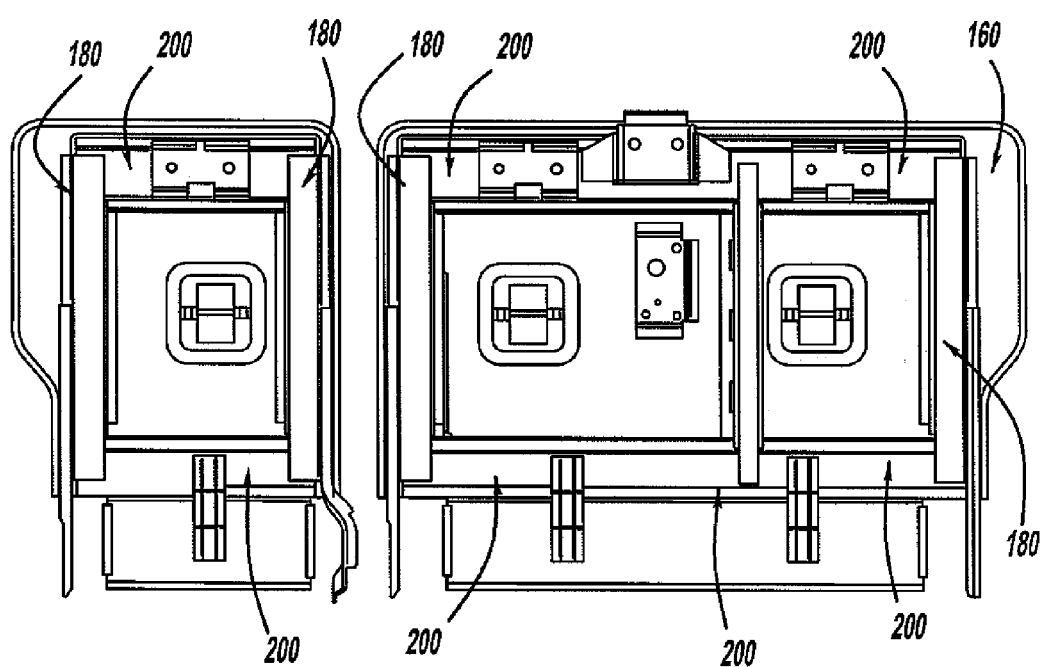
FIG. 13 is a front elevation view of the seat back frame of FIG. 3 with a high latch connection.

Referring now, in particular to FIGS. 11, 12 and 13, a pair of seat back frames 60 are shown according to one exemplary embodiment. Each seat back frame 60 is typically completed with a foam cushion and a trim cover (not shown), to provide a seat back portion 30 that is configured to support the back of an occupant. Each seat back frame 60 includes a back panel 160, vertical frame members 180, horizontal frame members 200, and a plurality of additional brackets and supports as may be appropriate.

The vertical frame members 180 are formed using a stamping (or pressing) process and the horizontal frame members 200 are formed using a roll-forming process. Because non-first row vehicle seats generally have a consistent height, even from vehicle to vehicle and across various applications, the vertical frame members 180 may be similar or identical in all of these various applications. However, vehicles, and their non-first row seats in particular, generally have inconsistent widths from vehicle to vehicle and across various applications. Thus, the horizontal frame members 200 of the vehicle seat back frame 60 have many different lengths for the various vehicles and applications requiring different seat widths.

According to one exemplary embodiment, by roll forming the horizontal frame members 200, it is possible to cut each horizontal frame member 200 at a desired length for each seat back frame 60 width that is desired. Alternatively it is possible to produce standard size length horizontal frame members 200 which are then cut to length (i.e., smaller pieces) with less waste.

In one alternative exemplary embodiment, the horizontal frame members 200 are stamped from a flat, preformed blank. Since the horizontal frame members 200 have varying widths from one vehicle seat back frame 60 to another, the stamping tool (or tools if progressive dies are desired) is preferably designed to accommodate the greatest horizontal width for the range of widths required for the horizontal frame members 200. When a horizontal frame member 200 having a length less than the stamping tool width is produced, the flat, preformed blank from which the horizontal frame member 200 is to be produced is simply put in the larger stamping die located and formed—and some portion of the stamping tool goes unused. This method is acceptable since the horizontal frame members 200 have a constant depth u-shaped cross section 202 as best shown in FIG. 24a. It should be understood that the processes described are not meant to be limiting and the vertical and horizontal frame members 180 and 200, respectively, may be formed with a variety of processes while still providing the function of a standardized vertical frame member 180 an variable width horizontal frame members 200.

Referring in particular now to FIGS. 20 through 21, vertical frame members 180 are shown according to an exemplary embodiment. The vertical frame members 180 are formed with a stamping process by first producing a flat, patterned steel blank and then stamping the blank (directly or progressively) into the shaped vertical frame member 180 having a u-shaped cross-section 181 having a constantly varying depth over at least a portion of the vertical frame member 180. Two vertical frame members 180 are coupled to the back panel 160 proximate the vertical edges of the seat back member 160. One (or more) additional vertical frame supports 186 may be provided to add additional strength and stiffness to the seat back frame 60. The vertical frame support 186 is preferably identical to the vertical frame member 180 and may have an alternative shape.

The vertical frame members 180 have a generally u-shaped cross section 181 and flanges 182 that extend outward to facilitate coupling the vertical frame members 180 to the back panel 160 and to the horizontal frame members 200. For embodiments of the seat 20 with a back frame 60 that is rotatably coupled to the vehicle 10 towards the bottom of the seat back frame 60, the vertical frame members 180 have a generally tapered profile and the depth of the profile increases closer to the bottom end 183. The vertical frame member 180 has a deeper profile towards the bottom end 183 to better manage the increased forces and moments applied at end 183 compared to the forces and moments applied at the upper end 184. The upper end 184 has a smaller depth to decrease the material used, which decreases the weight of the seat 20.

Referring now in particular to FIGS. 22 through 25, horizontal frame members 200 are shown according to an exemplary embodiment. As described above, according to an exemplary embodiment, the horizontal members 200 are preferably formed using a roll-forming process. Two horizontal frame members 200 are coupled to the back panel 160 proximate the top and bottom edges of the back panel 160. The horizontal frame members 200 also preferably have a generally u-shaped (or "hat" shaped) cross-section 201 and flanges that extend outward to facilitate coupling them to the back panel. At least a portion of the horizontal frame member 200 may extend outward past the vertical frame member 180 to support the cantilevered or laterally extending portion of the back panel 160. The horizontal frame members 200 may have a different length depending on the width of the frame portion they form. FIGS. 22 through 23 show horizontal frame members 200 for the 60% portion of a 60/40 seat back frame of FIG. 11 while FIGS. 24 through 25 show horizontal frame members for the smaller 40% portion.

Figure 26:
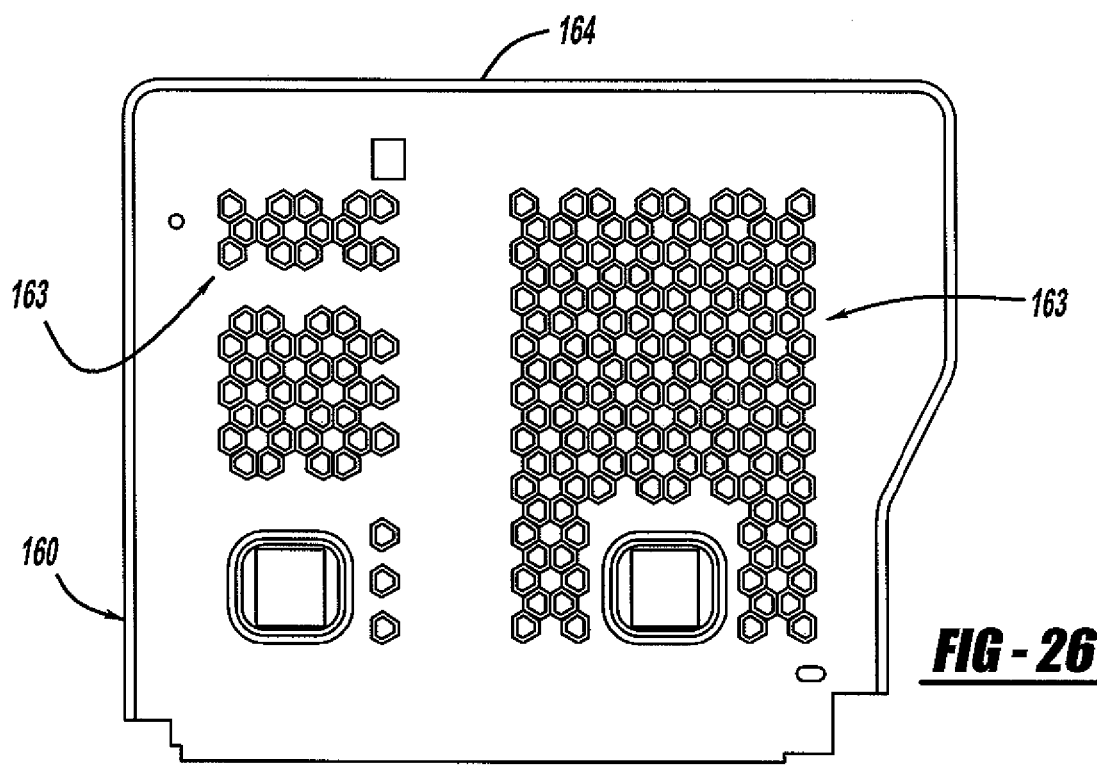
FIG. 26 is a plan view of a seat back cover for one portion of the seat back frame in FIG. 11.
Figure 27:
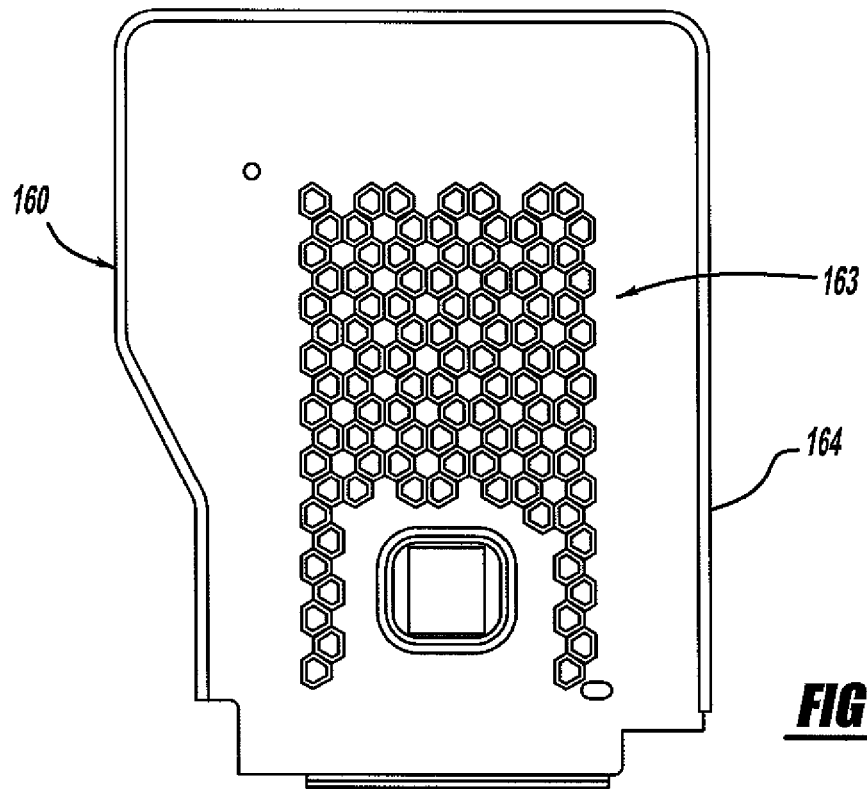
FIG. 27 is a top plan view of a seat back cover for the other portion of the seat back frame in FIG. 11.

Referring now in particular to FIGS. 26 through 27, back members (panels or pans) 160, are shown according to an exemplary embodiment. The back panel 160 is coupled to the horizontal and vertical frame members 200 and 180, respectively, to form the main body portion of the back frame 60. According to an exemplary embodiment, the back panel 160 is a generally flat, planar body with features formed therein. In a typical seat frame, the back panel is formed of a metal material using a stamping process and the back panel may include a plurality of ribs or other strengthening features that cause the overall depth of the back panel to be increased while strengthening it. The use of ribs results in an uneven surface, an additional panel member may be coupled to the back panel to provide a flat surface for upholstery or other finishing creating a class A surface.

According to an exemplary embodiment, the back panel 160 includes a plurality of relatively shallow depressions or indentations 163. The indentations 163 are provided in selected areas of the back panel 160 to add stiffness to the back frame 60 but are shallow enough that the back panel 160 retains a generally flat surface to which upholstery or other finishing material may be applied. The back panel 160 may also have a curled edge 164 that is configured to add additional stiffness to the back panel 160. The back panel 160 vertical frame member 180, and horizontal frame members 200 form the main body of the back frame 60. The back frame 60 further may include a plurality of brackets and other components that are coupled to the back panel 160, vertical frame members 180 and horizontal frame members 200 to provide other features.

Referring to FIGS. 28 through 29, coupling plates 220 are shown according to an exemplary embodiment. The coupling plates 220 facilitate the coupling of the recliners 61 to the vertical frame members 180 with bolts, rivets, or other suitable fasteners and/or other attachment means such as welding. Referring now in particular to FIG. 30, a seat belt retractor bracket 240 is shown according to an exemplary embodiment. The retractor bracket 240 is coupled to the back panel 160 and provides a mounting surface for a seat belt retractor for the middle passenger of the vehicle seat 20 and is of an appropriate design to integrate with the seat back frame 60.

Referring now in particular to FIG. 31, a seat belt exit bracket 250 is shown according to an exemplary embodiment. The seat belt exit bracket 250 is coupled to the upper horizontal frame member 200 and guides the seatbelt from the retractor 242 through an opening in an upper surface (now shown) in the seat back 30.

Referring now in particular to FIGS. 32 through 33, headrest bracket 260 and 270 are shown according to an exemplary embodiment. Headrest brackets 260 and 270 are also coupled to the upper horizontal frame member 200 and couple headrest 262 to the seat back frame 60. According to various exemplary embodiments, different types of headrests 262 may be coupled to the seat back frame 60. For example, the headrest bracket 270 may be an adjustable bracket (as shown in FIGS. 33A and 33B) or may be an articulating headrest bracket 260 (as shown in FIGS. 32A and 32B).

Referring now in particular to FIGS. 34 through 36, an ISOFIX (or LATCH) bar assembly 280 is shown according to an exemplary embodiment. THE ISOFIX assembly 280 is preferably coupled to the lower horizontal frame member 200 and provides a feature to which a child safety seat may be attached to an ISOFIX wire 283. Referring now in particular to FIGS. 37 and 38, reinforcing members 310 and 320 are shown according to an exemplary embodiment. The reinforcing members 310 and 320 are selectively located and coupled to the seat back frame 60 to add strength to the final assembly as appropriate for a given seat back frame 60. The reinforcing members 310 and 320 are preferably welded to the seat back frame 60 using an appropriate welding technique including laser welding.

As described above, the seat back frame 60 may be configured with a high-lock connection in which the back frame 60 is coupled to the vehicle near the top of the back frame as shown in FIGS. 3 and 13. The seat back frame 60, for use in a high-lock application, is shown. Because the forces on the frame 60 having a high-lock connection assembly are different than the forces on the frame 60 having a low-lock (recliner mechanism) connection, the horizontal and vertical frame members 200 and 180, respectively, may be different or arranged differently. Notwithstanding, for the seat back frames 60 of the exemplary embodiments, the same tooling is used to form the roll-formed upper horizontal frame members 200 for the low-lock seat back frame 60 and to form the horizontal frame members 200 for the high-lock seat back frame 60.

Figure 19:
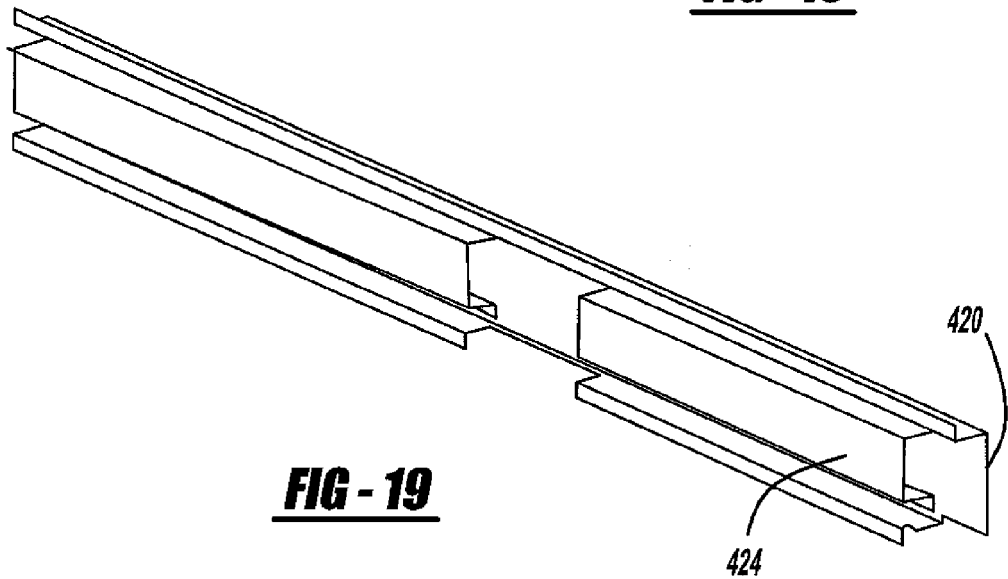
FIG. 19 is an isometric view of a smaller horizontal frame member nested inside a larger horizontal frame member to reinforce the larger horizontal frame member as in the frame shown in FIG. 3.

Referring now in particular to FIG. 19, for the low lock application, greater forces are carried along the upper horizontal frame member 200. However, for the exemplary embodiments shown, two horizontal frame members 200 are shown; a first outer, horizontal frame member 420 having a larger cross section and a second inner, horizontal frame member 424 having a relatively smaller cross section. The second, or reinforcing, horizontal frame member 424 nests within and reinforces the first horizontal frame member 420. The present arrangement provides for greater design and manufacturing flexibility while providing a vehicle seat back frame 60 having an improved strength/weight ration since the weight is reduced.

The back frame 60 and its components are preferably formed from high or ultra-high strength steel and/or allows and is configured to be substantially assembled with laser welding operations as shown in FIGS. 14 through 18 and 41 but may be made from any appropriate material an assembled using any appropriate process.

Figure 15:
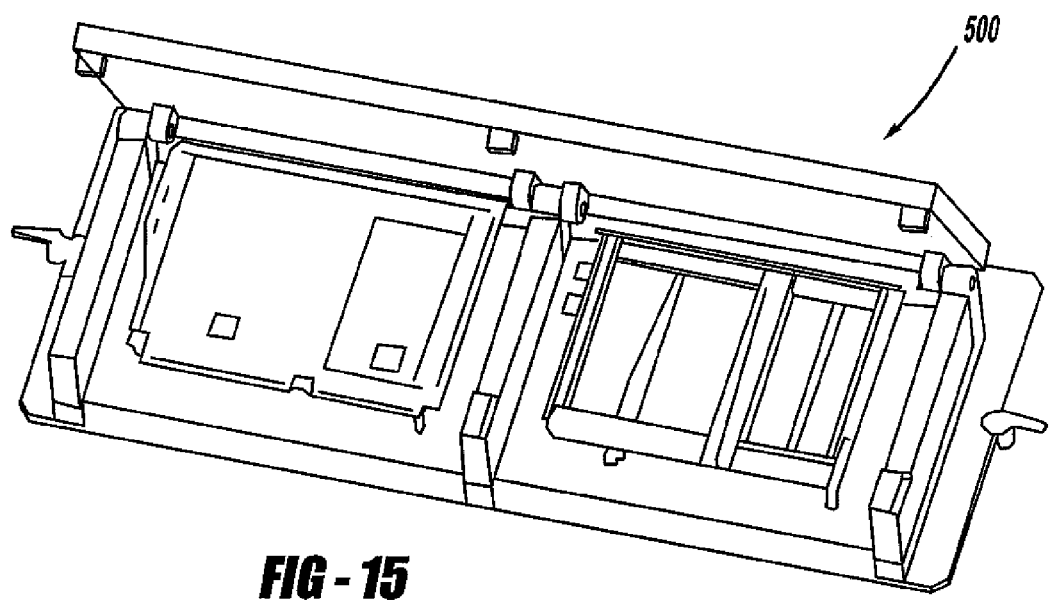
FIG. 15 is an isometric view of a fixture for a laser welding operation according to an exemplary embodiment.
Figure 16:
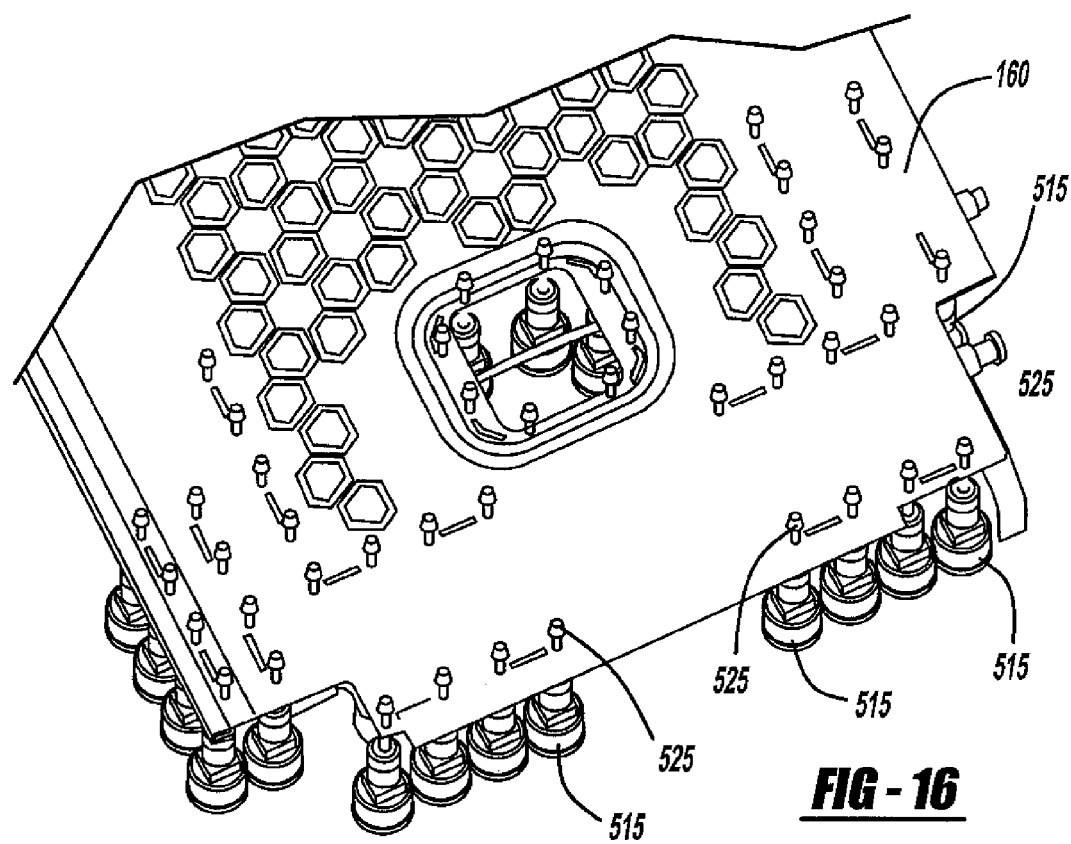
FIG. 16 is a partial isometric view of a portion of a seat back frame showing the placement of holding pins in the fixture during the laser welding operation according to an exemplary embodiment.
Figure 17:
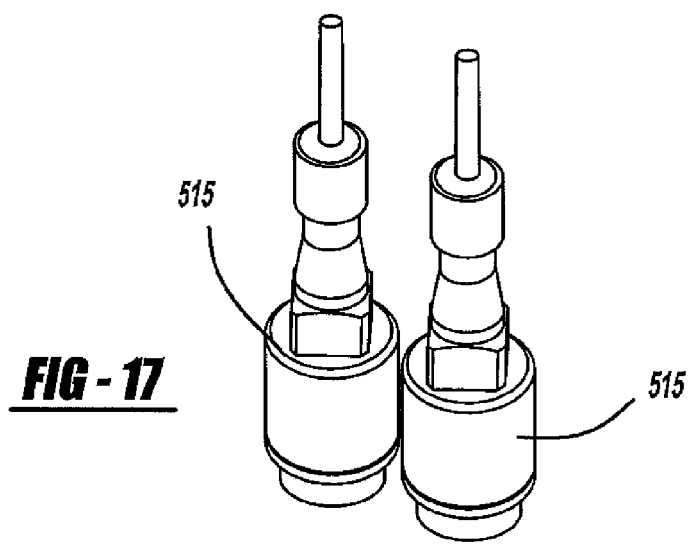
FIG. 17 is an isometric view of two of the hydraulic pins in FIG. 16.
Figure 18:
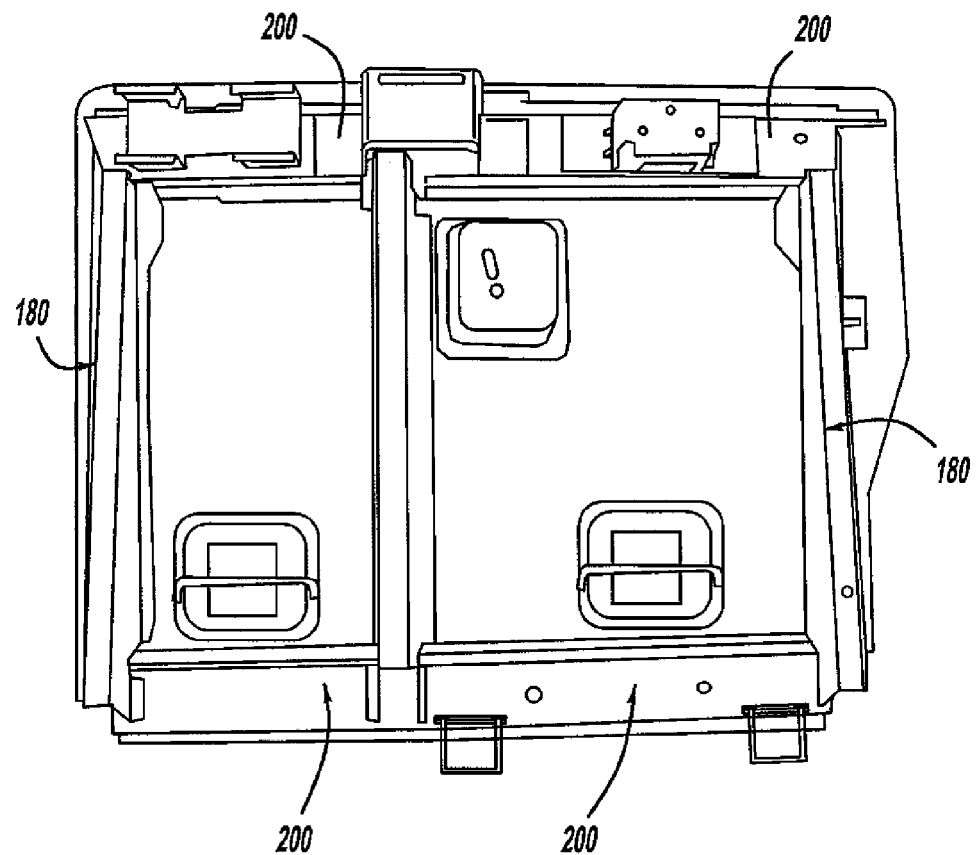
FIG. 18 is an elevation view of a welded seat back frame according to an exemplary embodiment.

According to an exemplary embodiment, a single fixture 500 is preferably used to do the majority of the laser welding operations to assemble the frame in a single fixture without the need for multiple fixtures or transfers. One exemplary figure 500 is shown in FIG. 15. Smaller sub-assemblies that have welded surfaces substantially perpendicular to the back panel 160 may be placed in the fixture, welded, then removed and reoriented in the fixture 160 to be welded to the rest of the seat back frame 60. The fixture may include a base 505 and a lid 510 that close around the components that make up the seat back frame 60. The base 505 includes a plurality of hydraulic pins 515 that trap the seat back frame 60 against fixed pins in the lid 510 to substantially hold the frame fixed as shown in FIGS. 16 and 17. The lid 510 of the fixture 500 further includes a plurality of slots or openings.

Figure 14:
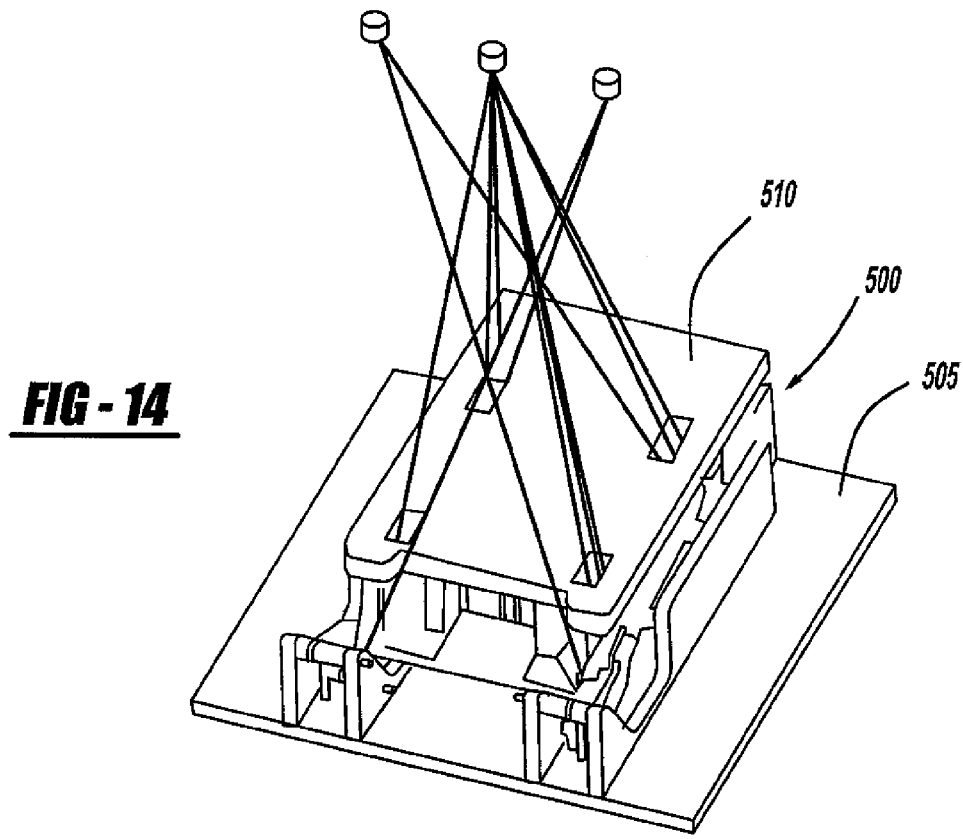
FIG. 14 is an isometric view of a laser welding station according to an exemplary embodiment.
Figure 41:
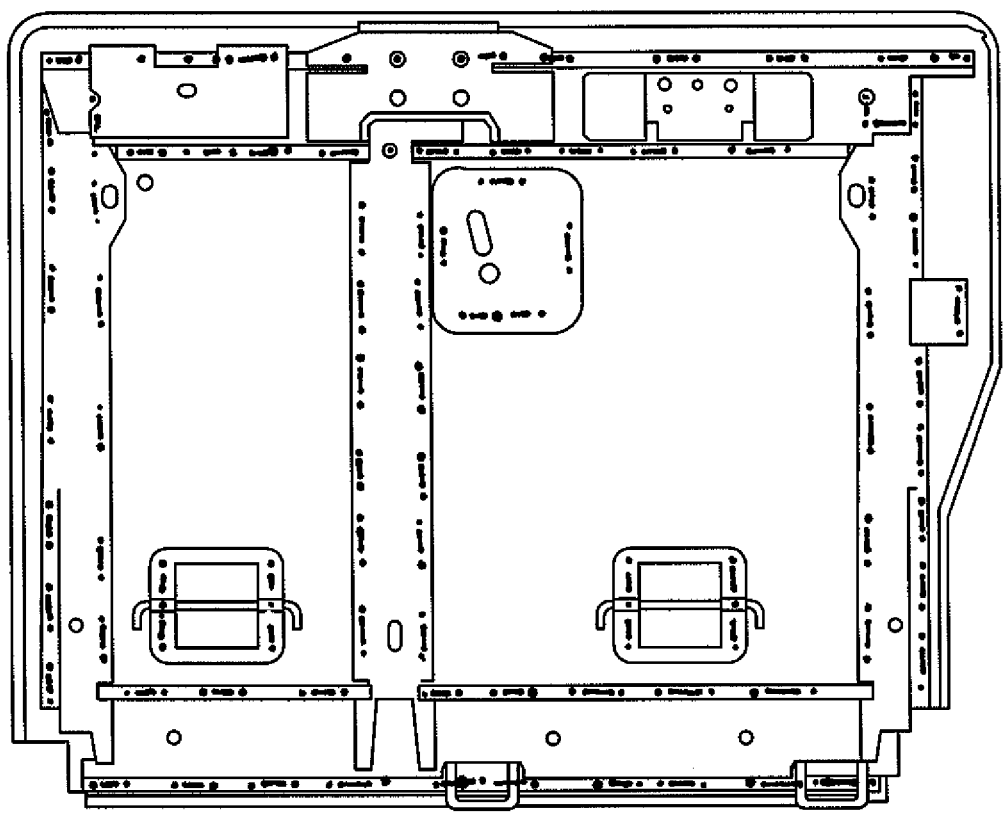
FIG. 41 is a plan view of the seat back frame in FIG. 18 showing the location of the welds and hydraulic pins.

Referring to FIG. 14, a laser from a source above the fixture is pointed through the slots to weld the frame 60. The welding process is configured to minimize the total length of welds needed to form the frame 60. The frame 60 components are arranged such that all welded joints are thin/thin joint or thick/thick joints (i.e., all welded joints have a top piece with a thickness less than or equal to the thickness of the bottom piece). The frame 60 is, in one alternative exemplary embodiment shown, arranged such that a line-of-sight can be made from one laser at a single laser-welding station, eliminating the need for multiple costly laser welding stations. In FIG. 41, the placement of the welds and the pins 525 for laser welding the seat back frame 60 in the fixture is shown.

In one exemplary embodiment, the seat back frame 60 and the horizontal and vertical frame members 200 and 180, respectively, are designed to have ends designed to fit and be permanently connected using the laser welding and fixture 500. As best shown in FIGS. 39 and 40 and upper joint 208 between the outside vertical frame member 180 and the upper horizontal frame member 200 allows the vertical frame member 180 to be very closely nested with the horizontal frame member 200. Similarly, for a lower joint 209 between the frame members, as best shown in FIGS. 40A and 40B, the parts are closely nested to allow for laser welding of the parts.

The seat back frame 60 is capable of accommodating many features common in the art. The seat back frame 60 can accommodate stow-flat, flip and fold, fold and tumble and other configurations. The seat back frame 60 can also accommodate a variety of pass-through systems by adding an opening in the back panel 160 where needed.

The construction and arrangement of the elements of the processes for forming a vehicle seat back frame shown in the various exemplary embodiments disclosed, including the best embodiment, are illustrative only. Only a few embodiments of the present disclosure are described in detail herein. Those of ordinary skill in the art who review this disclosure will readily appreciate that modifications are possible without departing from the novel teachings and advantages of the disclosure as limited only by the following claims.

What is claimed is:

1. A method of manufacturing a vehicle seat back having a vehicle seat back frame for use in multiple vehicles, the method comprising the steps of:
   stamping a first frame member having a generally u-shaped cross section and having a longitudinal extent, the first frame member being arranged in the seat back frame and aligned vertically and wherein the u-shaped cross section of the first frame member has a first depth at a first location and a second depth at a second location; said first depth different than said second depth;
   roll forming a second frame member having a generally u-shaped cross section and having a longitudinal extent, the second frame member being arranged in the seat back frame and aligned horizontally wherein the u-shaped cross section of the second frame member has a substantially constant depth; and
   wherein the first frame member is a common part used in multiple vehicles having a substantially constant height vehicle seat backs and the second frame member are cut to different lengths to produce seat back frames for use in multiple vehicles having different width vehicle seat backs.

2. The method of claim 1 further comprising the steps of:
   stamping a third frame member having a generally u-shaped cross section and having a longitudinal extent, the third frame member being arranged in the seat back frame and aligned vertically and spaced from the first frame member and wherein the u-shaped cross section of the third frame member has a constantly varying depth; and
   roll forming a fourth frame member having a generally u-shaped cross section and having a longitudinal extent, the fourth frame member being arranged in the seat back frame and aligned horizontally and spaced from the first frame member and wherein the u-shaped cross section of the fourth frame member has a substantially constant depth.

3. The method of claim 1 further comprising the step of manufacturing the vehicle seat back for use in a second row of a vehicle.

4. The method of claim 1 further comprising the step of manufacturing the vehicle seat back for use in a third row of a vehicle.

5. The method of claim 1 further comprising the step of manufacturing the vehicle seat back for use in a second row of a sedan-type vehicle and in a second row of a utility-type vehicle.

6. The method of claim 1 further comprising the step of manufacturing the vehicle seat back for use in a third row of a vehicle.

7. A method of manufacturing a vehicle seat back having a vehicle seat back frame for use in multiple vehicles, the method comprising the steps of:
   stamping a first frame member having a generally u-shaped cross section and having a longitudinal extent, the first frame member being arranged in the seat back frame and aligned vertically and wherein the u-shaped cross section of the first frame member has a first depth at a first location and a second depth at a second location; said first depth different than said second depth;
   roll forming a second frame member having a generally u-shaped cross section and having a longitudinal extent, the second frame member being arranged in the seat back frame and aligned horizontally wherein the u-shaped cross section of the second frame member has a substantially constant depth; and wherein the first frame member is a common part used in multiple vehicles having a substantially constant height vehicle seat backs and the second frame member is cut to length used in multiple vehicles having different width vehicle seat backs.

8. The method of claim 7 further comprising the steps of:

stamping a third frame member having a generally u-shaped cross section and having a longitudinal extent, the third frame member being arranged in the seat back frame and aligned vertically and spaced from the first frame member and wherein the u-shaped cross section of the third frame member has a constantly varying depth; and roll forming a fourth frame member having a generally u-shaped cross section and having a longitudinal extent, the fourth frame member being arranged in the seat back frame and aligned horizontally and spaced from the first frame member and wherein the u-shaped cross section of the fourth frame member has a substantially constant depth.

9. The method of claim 8 further comprising the step of manufacturing the vehicle seat back for use in a third row of a vehicle.

* * * * *